United States Patent
Palfai et al.

(10) Patent No.: US 7,849,755 B2
(45) Date of Patent: Dec. 14, 2010

(54) STARTER MOTOR WITH BI-DIRECTIONAL CLUTCH

(75) Inventors: Balazs Palfai, Fishers, IN (US); David L. Durant, Anderson, IN (US); Joel M. Gray, Fishers, IN (US); Peter K. Farrar, Indianapolis, IN (US); Wojciech M. Golab, Fishers, IN (US); Gus Sumcad, Fishers, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 37 days.

(21) Appl. No.: 11/782,322

(22) Filed: Jul. 24, 2007

(65) Prior Publication Data

US 2008/0022791 A1  Jan. 31, 2008

Related U.S. Application Data

(60) Provisional application No. 60/833,451, filed on Jul. 26, 2006.

(51) Int. Cl.
*F02N 15/06* (2006.01)
*F16D 13/04* (2006.01)
*F16H 3/44* (2006.01)

(52) U.S. Cl. .......................... 74/7 C; 192/42; 375/318

(58) Field of Classification Search .............. 74/6, 74/7 R, 7 C, 7 D, 7 E; 290/1 C, 4 C, 36 R, 290/38 R–38 E; 310/75 R, 83; 475/317, 475/318; 192/42, 45, 44

See application file for complete search history.

(56) References Cited

U.S. PATENT DOCUMENTS

| 2,919,000 | A | * | 12/1959 | Claytor | 192/84.8 |
| 3,134,471 | A | * | 5/1964 | Croswhite | 192/44 |
| 4,178,805 | A | * | 12/1979 | Mazzorana | 74/6 |
| 4,819,975 | A | * | 4/1989 | Morishita et al. | 290/48 |
| 5,307,702 | A |   | 5/1994 | Spellman et al. | |
| 5,765,439 | A | * | 6/1998 | Araki | 74/7 R |
| 6,109,122 | A | * | 8/2000 | Bori et al. | 74/7 E |
| 2008/0053777 | A1 | * | 3/2008 | Kamei et al. | 192/45 |

FOREIGN PATENT DOCUMENTS

JP  2000337404 A  * 12/2000

* cited by examiner

*Primary Examiner*—Thomas R Hannon
*Assistant Examiner*—Phillip A Johnson
(74) *Attorney, Agent, or Firm*—Cantor Colburn LLP

(57) ABSTRACT

Disclosed herein is a starter motor clutch. The clutch includes, a shell, a wedgable component support member operably positioned adjacent the shell, and at least one wedgable component positioned between the shell and the wedgable component support member. The at least one wedgable component is displaceable into engagement with the shell to lock the shell into synchronous movement with the wedgable component support member upon initial rotational movement of the wedgable component support member in either direction relative to the shell while allowing asynchronous movement of the shell relative to the wedgable component support member.

15 Claims, 5 Drawing Sheets

STARTER MOTOR WITH BI-DIRECTIONAL CLUTCH

CROSS REFERENCE TO RELATED APPLICATIONS

This application claims priority to U.S. provisional application, 60/833,451, filed Jul. 26, 2006, the entire contents of which are incorporated herein by reference.

BACKGROUND OF THE INVENTION

Starter motors typically have an armature, gear system, clutch and pinion in a stacked axial alignment along a major axis of the machine. Such an arrangement limits how short the machine can be along the major axis. With the continuing desire for increased cabin volume in modern automobiles any decrease in size of the components in the engine compartment is well received. As such, a decrease in the major axis of the starter motor would also be well received.

BRIEF DESCRIPTION OF THE INVENTION

Disclosed herein is a starter motor clutch. The clutch includes, a shell, a wedgable component support member operably positioned adjacent the shell, and at least one wedgable component positioned between the shell and the wedgable component support member. The at least one wedgable component is displaceable into engagement with the shell to lock the shell into synchronous movement with the wedgable component support member upon initial rotational movement of the wedgable component support member in either direction relative to the shell while allowing asynchronous movement of the shell relative to the wedgable component support member.

Further disclosed herein is a starter motor. The starter motor includes, a housing, an armature within the housing, a pinion within the housing drivable by the armature, and a clutch within the housing in operational communication with the armature and the pinion. The clutch includes, a shell, a wedgable component support member operably positioned adjacent with the shell, and at least one wedgable component positioned between the shell and the wedgable component support member. The at least one wedgable component is displaceable into engagement with the shell to lock the shell into synchronous movement with the wedgable component support member upon initial rotational movement of the wedgable component support member in either direction relative to the shell while allowing asynchronous movement of the shell relative to the wedgable component support member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
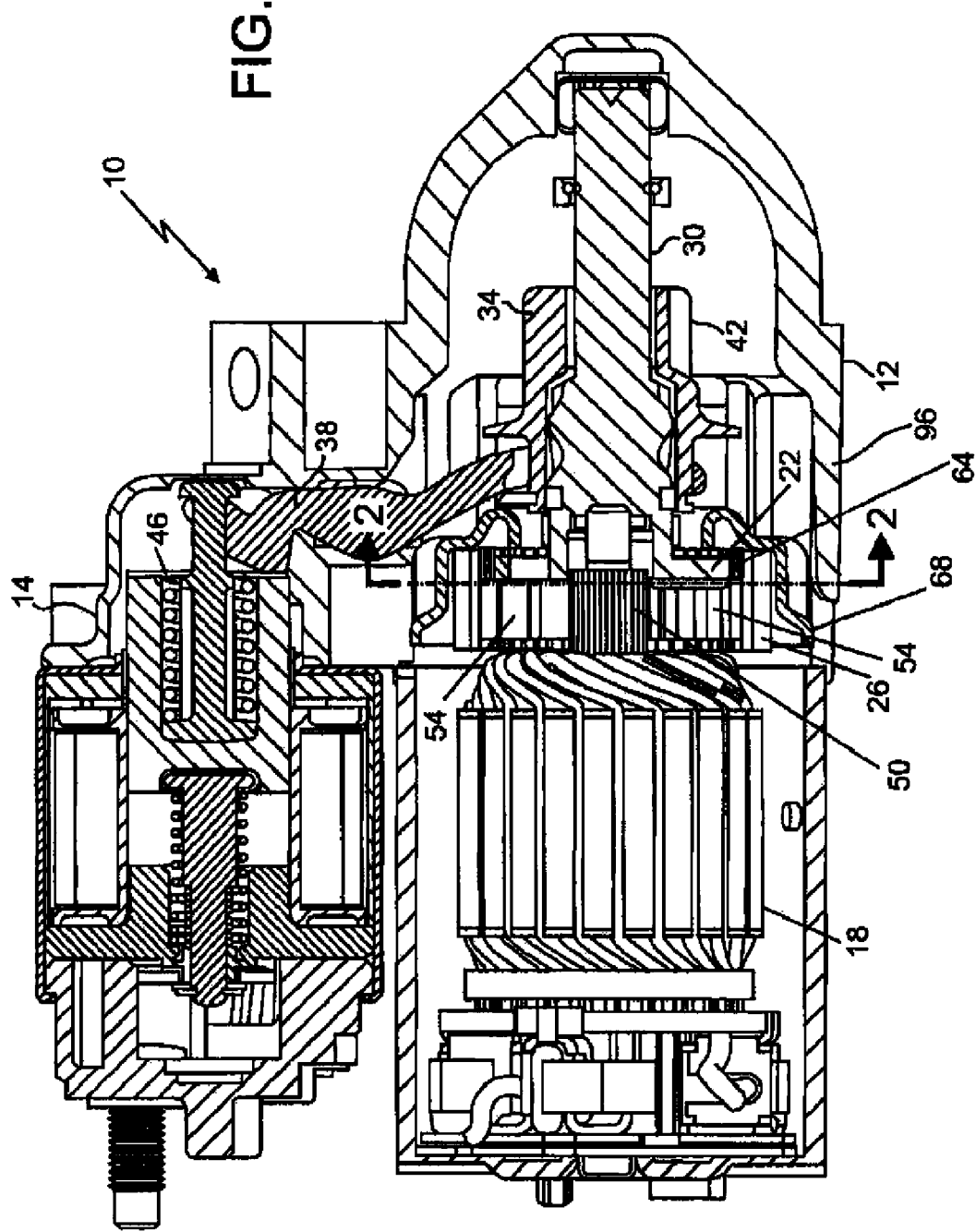
FIG. 1 depicts a sectioned view of the starter motor disclosed herein.

Referring to FIG. 1, a starter motor 10 disclosed herein is illustrated in cross section. The starter motor 10 includes among other things, a housing 12, a solenoid 14, an armature 18, a gear system 22, a clutch 26, a shaft 30 and a pinion 34. The armature 18 provides rotational energy to the pinion 34 through the gear system 22, the clutch 26 and the shaft 30. This rotational energy is used to start an engine, such as an internal combustion engine of an automobile (not shown), for example. To do so the solenoid 14 is electrically energized causing a lever 38 to move the pinion 34 axially along the shaft 30 until external gear teeth 42 on the pinion engage with gear teeth (not shown) on a flywheel of the engine. Once the engine starts, the rotational velocity of the engine quickly overtakes the rotational velocity of the pinion 34. When this happens, the clutch 26 disengages the pinion 34 from the armature 18 to prevent damage to the starter motor 10 as will be described in greater detail below. Once the engine is started electrical energy to the solenoid 14 is removed and a return spring 46 within the solenoid 14 returns the solenoid 14 and the pinion 34, through the lever 38, to its original position along the shaft 30.

Figure 2:
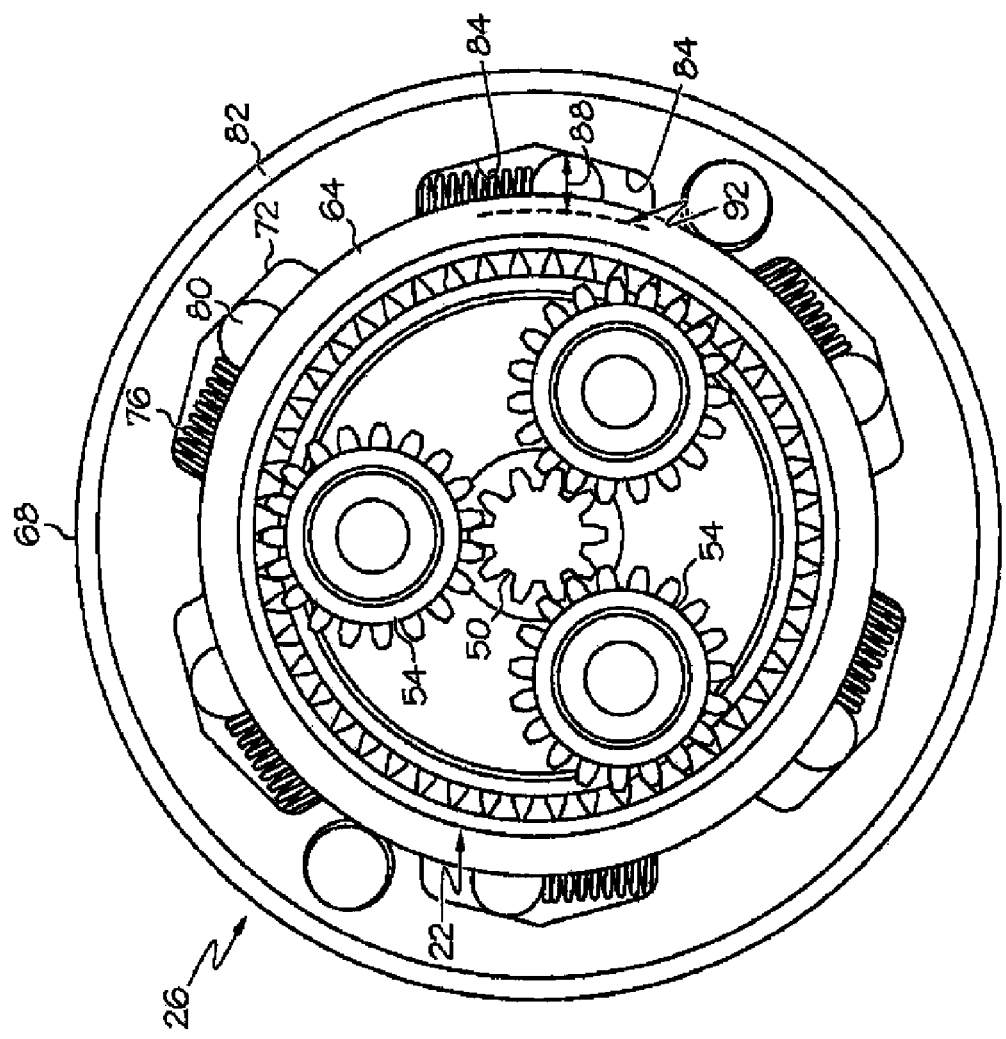
FIG. 2 depicts a cross sectional view of the starter motor of FIG. 1 taken at arrows 2-2.
Figure 3:
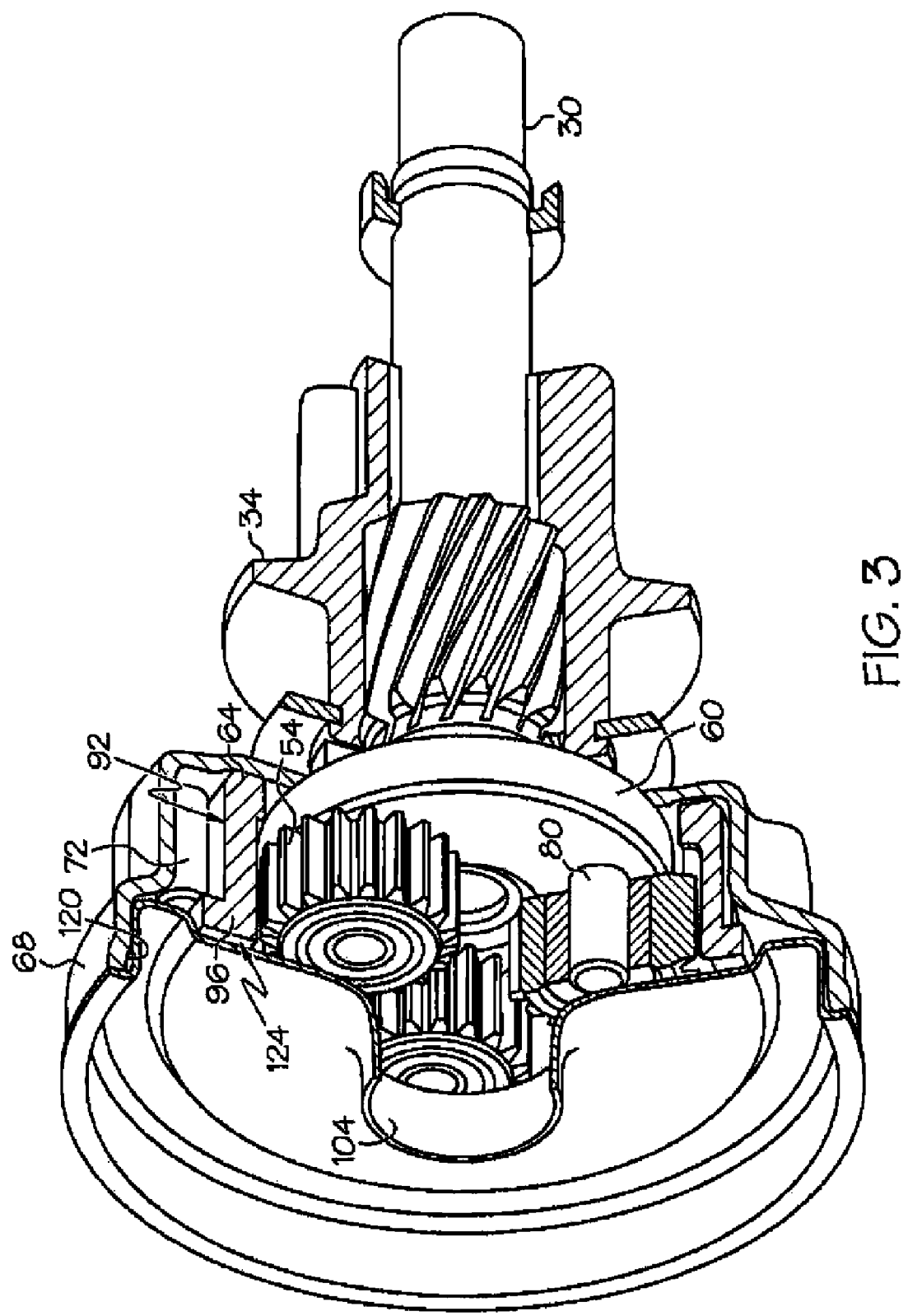
FIG. 3 depicts a partially sectioned perspective view of the clutch disclosed herein shown in assembly with a gear system, shaft and pinion.

With reference to FIGS. 2 and 3, the gear system 22 and clutch 26 will be described in detail. In this embodiment the gear system 22 is a planetary gear system although other embodiments could use other mechanisms for rotational reduction such as harmonic drives and cyclo reductors, for example. A sun gear 50 is connected to the output of the armature 18 and rotationally drives one or more planet gears 54. All three of the planet gears 54 are attached to a flange 60 of the shaft 30. As such, rotation of the planet gears 54 around the sun gear 50 results in rotation of the shaft 30. The planet gears 54, however, may not revolve around the sun gear 50 if a ring gear 64 engaged with the three planet gears 54 is allowed to rotate. In this situation, the sun gear 50 will cause the planet gears 54 to rotate about their individual axis thereby driving the ring gear 64 to rotate while the flange 60 and shaft 30 remain stationary. Thus, rotational coupling of the armature 18 with the shaft 30 is controllable by controlling the rotational freedom of the ring gear 64.

Rotational control of the ring gear 64 is accomplished, in this embodiment, with the clutch 26. The clutch 26 includes a shell 68 with a plurality of pockets 72 having a biasing member disclosed herein as spring 76 and a wedgable component referred to hereinafter as roll 80 positioned therewithin, and a wedgable component support member, which in this embodiment is represented as the ring gear 64. It should be noted that although in this embodiment the wedgable member is roll 80 with a cylindrical shape alternate embodiments could use wedgable members with non-cylindrical shapes such as elliptical or polygonal, for example. The shell 68 has relatively thin walls 82 made from a process such as stamping, for example, for shells made of metal. The springs 76 and rolls 80 are oriented within the pockets 72 so that the springs 76 all bias the rolls 80 in the same circumferential direction, which is clockwise as viewed in FIG. 2. The pockets 72 have a pentagon shape with the two radially outermost surfaces 84 having an arcuate shape as well. Each of the pockets 72 is symmetrical about a radial line extending from an axis of the shell 68 through a point where the outermost surfaces 84 meet. An annular distance 88 between the outermost surfaces 84 and an outer radial surface 92 of the ring gear 64 is greatest where the two outermost surfaces 84 meet and decreases at distances further from where the two outermost surfaces 84 meet. The annular distance 88 is sized to be larger than the diameter of the rolls 80 at its greatest point and smaller than the diameter of the rolls 80 at its smallest point. Thus, when the rolls 80 are positioned toward the center of the pockets 72 the rolls 80 are free to rotate and, consequently, the ring gear 64 is free to rotate within the shell 68. This condition occurs when the ring gear 64 is rotated in a counterclockwise direction relative to the shell 68 in the view of FIG. 2. The rolls 80 in this instance are being forced toward the springs 76 and toward the center of the pockets 72 where the annular distance 88 is greatest. When there is no relative motion between the ring gear 64 and the shell 68 the rolls 80 are partially wedged between the outer radial surface 92 and the shell 68 due to the springs 76 bias against the rolls 80 in that direction. With any clockwise rotation of the ring gear 64 relative to the shell 68, therefore, the rolls 80 become even further wedged between the ring gear 64 and the shell 68 thereby prevents any additional relative rotation therebetween.

The embodiment disclosed herein has the pockets 72 formed in the shell 68 that is radially outwardly of the outer radial surface 92. Alternate embodiments, however, could have pockets receptive of the springs 76 and the rolls 80 formed on a radially outwardly facing surface that interface with a cylindrical shaped radially inwardly facing surface of the shell, for example.

By fixing the shell 68 to the housing 12 in the foregoing structure a clockwise rotation of the sun gear 50 will cause the planet gears 54, the flange 60, the shaft 30 and the pinion 34 to all rotate clockwise as well. The rotational velocity of the above listed components is less than that of the sun gear 50 due to the reducing action of the gear system 22. The pinion 34 will cause the engine flywheel to rotate in the direction in which the pinion 34 is driving it until the engine starts. Once started the engine rotates the flywheel faster than the pinion 34 can drive it, and as such the flywheel begins driving the pinion 34. This driving action of the pinion 34 is communicated back to the planet gears 54 through the shaft 30 and the flange 60. The resultant torque on the ring gear 64 from this flywheel driven speed is in a counterclockwise direction thereby dislodging the rolls 80 from their wedged orientation and allowing the ring gear 64 to freely rotate relative to the shell 68. It should also be understood that the pockets 72 disclosed herein, being symmetrical, allow for full reversal in direction of operation of the clutch 26 by simply reversing the relative positions of the springs 76 and the rolls 80 within the pockets 72. Thus changing the direction of bias on the rolls 80 provided by the springs 76. As such, the starter motor 10 can be made to operate in either direction with no additional parts, design work or tool fabrication thereby saving costs for a producer.

The ring gear 64, in addition to having the outer radial surface 92, has a radially extending portion 96. The radially extending portion 96 axially retains the springs 76 and the rolls 80 in the pockets 72.

The relative positioning of the clutch 26 and the gear system 22 described in the structure above allows a major axis of the machine to be shorter than is possible with conventional starter motor structures. Specifically, the major axis through the armature 18, gear system 22, clutch 26, shaft 30 and pinion 34 may be shorter due to the clutch 26 being positioned radially outwardly of the gear system 22. Since the clutch 26 is in axial alignment with the gear system 22 and is not axially displaced from the gear system 22 the presence of the clutch 26 adds substantially no additional axial length to the major axis of the starter motor 10.

Figure 4:
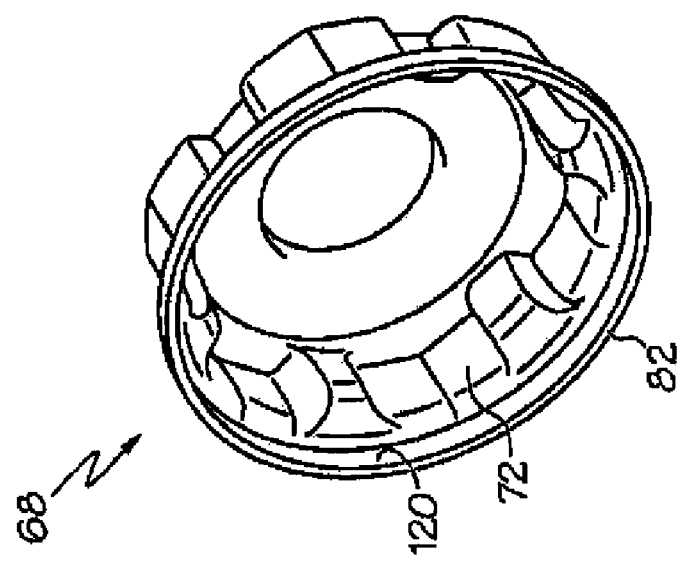
FIG. 4 depicts a perspective view of the shell of the clutch disclosed herein.

Referring to FIG. 4 since, as described above, the shell 68 may be fixed to the housing 12, the housing 12 can be used to structurally support the shell 68. For example, the shell 12 may be deep draw stamped from a thin metal such that the shape of the pockets 72 is easily observable on an outer surface thereof. Such a thin walled component, though easily manufactured, may not be rigid enough to prevent deformation due to the force of the rolls 80 wedging within the pockets 72. The housing 12, however, with thick walls 96 that may be cast aluminum, for example, can support the thin walled shell 68 and prevent such deformations. The walls 96 can be cast in details to complement the convoluted configuration of the outer surface of the shell 68. In addition to preventing deformation of the shell 68 the support of the shell 68 by the housing 12 may also attenuate noise due to impact of the rolls 80 against the shell 68 due to rapid changes in rotational velocity caused by the flywheel as the engine starts.

Figure 5:
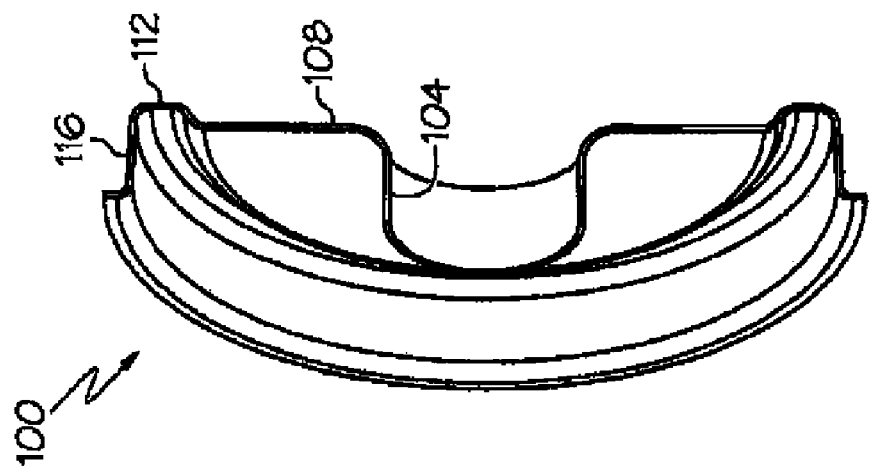
FIG. 5 depicts a cross sectional perspective view of the shield shown in assembly in FIG. 3.

Referring to FIG. 5, by positioning the clutch 68 radially outwardly of the ring gear 64 a shield 100 can be implemented that serves several purposes. First, the shield 100 acts as a dust seal to prevent brush and commutator wear debris from reaching the gear system 22. Secondly, the shield 100 retains grease in the pockets 72 to maintain lubrication to the rolls 80 and the springs 76 while also maintaining the springs 76 and roll 80 in proper axial alignment within the pockets 72. The shield 100, in this embodiment, includes an axially extending through hole 104 in an annular wall 108 having a radially extending flange 112 and an annular ring portion 116. The shield 100 may be retained to the clutch 26 and gear system 22 through an interference fit of the annular ring portion 116 with a complementary annular portion 120 (FIGS. 3 and 4) of the shell 68. The shield 100 may be made of a thin stamped metal, for example, to allow elastic flexibility to facilitate the interference fit with the shell 68. Such an interference fit may sealably attach the shield 100 to the shell 68 while holding the annular wall 108 in close proximity to an axial face 124 (FIG. 3) of the ring gear 64 thereby creating a seal between the ring gear 64 and the shield 100 in accommodation of their relative rotational movements. As such, the two fore mentioned seals may retain grease within the pockets 72 for the life of the starter motor 10.

In this embodiment, a diameter of the hole 104 is sized to accommodate the sun gear 50 therethrough, thereby creating a moving dust seal by the small annular clearance between the hole 104 and the sun gear 50. Centrifugal forces will act on dust particles that surround the armature 18 due to rotation thereof. Such centrifugal forces will urge the dust particles radially outwardly thereby discouraging axial movement of the dust particles through the hole 104. The shield may additionally provide bearing support to the armature 18. To do so a bearing (not shown) could be fixedly attached to the shield 100 at the hole 104 that operationally engages with the armature 18.

Figure 7:
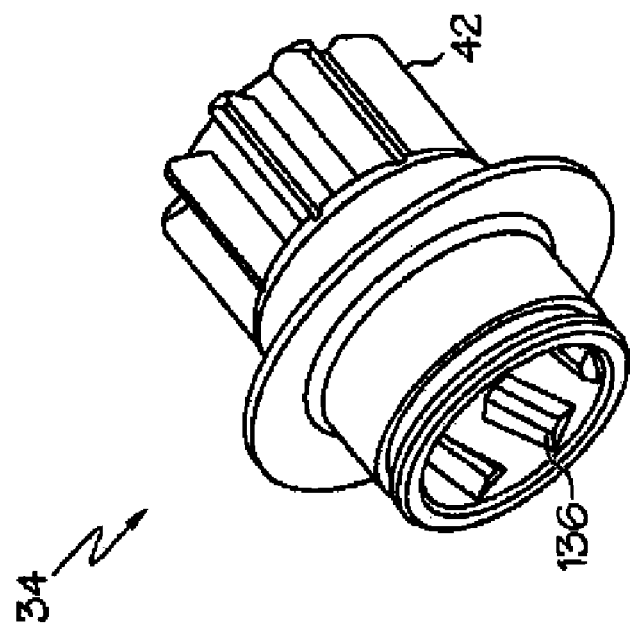
FIG. 7 depicts a perspective view of the pinion of FIG. 1.
Figure 6:
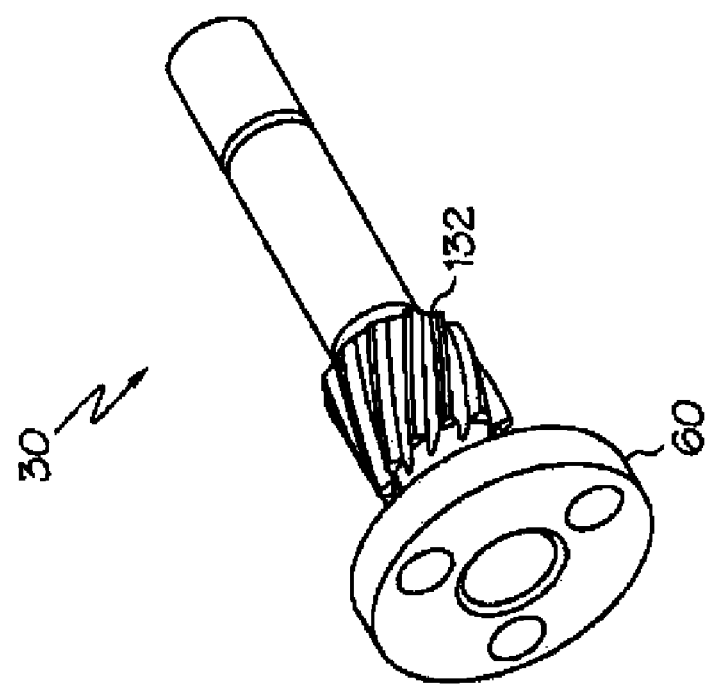
FIG. 6 depicts a perspective view of the shaft of FIG. 1.

Referring to FIGS. 6 and 7, the shaft 30 and pinion 34 are illustrated in detail. The shaft 30, as mentioned above, has the flange 60 that interfaces with the planet gears 54 by axles (not shown) that are fixedly attached to the flange 60 by, for example, threadable engagement into threaded holes 128. Further along the shaft 30 is gear 132. Although in this embodiment the gear 132 is helical alternate embodiments could have a non-helical gear. The pinion 34 has an internal gear 136 integrated on an inner diameter thereof. The internal gear 136 has a complementary helical angle to that of the gear 132 and as such engages with the gear 132. The engagement of the gears 132, 136 is such that the pinion 34 is axially movable relative to the shaft 30. Axial movement of the pinion 34 relative to the shaft 30 is controlled by the solenoid 14 through the lever 38 (FIG. 1) as described above.

The starter motor 10 disclosed herein, by having the internal gear 136 integrated directly onto the pinion 34, has fewer components than a typical starter motor in which a pinion is not rotationally fixed directly with a shaft but instead is coupled to a clutch, or other component, that is rotationally fixed to a shaft. The internal gear 136 is one the features of the disclosed starter motor 10 that allows the major axis, described above, to be shorter than that of conventional starter motors. This is due, in part, to the removal of the axial length required of an internal gear that is integrated into a clutch, or other component, that is axially stacked along the major axis of the machine.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A starter motor, comprising:
   a housing;
   an armature within the housing;
   a pinion within the housing drivable by the armature; and
   a clutch within the housing in operational communication with the armature and the pinion, the clutch comprising:
   a shell;
   a wedgable component support member operably positioned adjacent with the shell;
   at least one wedgable component biased and positioned between the shell and the wedgable component support member and displaceable into engagement with the shell to lock the shell into synchronous movement with the wedgable component support member upon initial rotational movement of the wedgable component support member relative to the shell in a direction of the bias while allowing asynchronous movement of the shell relative to the wedgable component support member upon movement of the wedgable component support member relative to the shell in a direction opposite to the bias, and reversal of the direction of the bias on the wedgable component relative to the wedgable component support member reverses a direction in which the shell locks synchronously with the wedgable component support member.

2. The starter motor of claim 1, wherein the armature is rotationally fixed to one of the wedgable component support member and the shell while the other of the wedgable component support member and the shell, whichever is not rotationally fixed to the armature, is rotationally fixed to the pinion.

3. The starter motor of claim 1, wherein the wedgable component support member is a ring gear of a gear system.

4. The starter motor of claim 3, wherein the ring gear includes a radially outwardly extending lip to retain the at least one wedgable component between the shell and the wedgable component support member.

5. The starter motor of claim 1, wherein the shell is made of stamped metal.

6. The starter motor of claim 1, wherein the housing is cast aluminum.

7. The starter motor of claim 1, wherein the housing structurally supports walls of the shell.

8. The starter motor of claim 1, wherein a gear system is positioned radially inwardly of the at least one wedgable component.

9. The starter motor of claim 8, wherein the gear system is a planetary gear system.

10. The starter motor of claim 1, wherein the pinion is axially movable relative to the armature and the clutch.

11. The starter motor of claim 1, further comprising a solenoid in operable communication with the pinion such that the solenoid moves the pinion relative to the clutch.

12. The starter motor of claim 1, further comprising a shaft having a spline engaged with an internal spline of the pinion.

13. The starter motor of claim 12, wherein the internal spline of the pinion is helical.

14. The starter motor of claim 1, further comprising a shield having an axially extending through hole in a planar field bounded by an annular wall, the through hole being receptive of a portion of the armature.

15. The starter motor of claim 14, wherein the shield further comprises a circumferential surface at an outer radial portion fixable to the shell to retain grease at the wedgable component.

* * * * *